United States Patent
Blomqvist

(10) Patent No.: US 8,474,316 B2
(45) Date of Patent: Jul. 2, 2013

(54) METHOD FOR MEASURING ANGULAR VELOCITY AND A VIBRATING MICROMECHANICAL SENSOR OF ANGULAR VELOCITY

(75) Inventor: Anssi Blomqvist, Helsinki (FI)

(73) Assignee: Murata Electronics Oy, Vantaa (FI)

( * ) Notice: Subject to any disclaimer, the term of this patent is extended or adjusted under 35 U.S.C. 154(b) by 601 days.

(21) Appl. No.: 12/155,059

(22) Filed: May 29, 2008

(65) Prior Publication Data
US 2008/0314144 A1 Dec. 25, 2008

(30) Foreign Application Priority Data

Jun. 1, 2007 (FI) .................................... 20075403
May 12, 2008 (FI) .................................... 20085441

(51) Int. Cl.
*G01C 19/56* (2012.01)
(52) U.S. Cl.
USPC ....................................................... 73/504.12
(58) Field of Classification Search
USPC ........................................ 73/504.12, 504.14
See application file for complete search history.

(56) References Cited

U.S. PATENT DOCUMENTS

| | | | |
|---|---|---|---|
| 5,817,940 A | 10/1998 | Kobayashi et al. | |
| 6,230,563 B1 | 5/2001 | Clark et al. | |
| 6,370,937 B2 * | 4/2002 | Hsu | 73/1.37 |
| 7,526,957 B2 * | 5/2009 | Watson | 73/504.16 |
| 2004/0026720 A1 | 2/2004 | Schiller | |
| 2004/0211257 A1 | 10/2004 | Geen | |

FOREIGN PATENT DOCUMENTS

| | | |
|---|---|---|
| JP | 06160102 | 6/1994 |
| JP | 09-250928 | 9/1997 |
| JP | 2000-329562 | 11/2000 |
| JP | 2001-356017 | 12/2001 |

OTHER PUBLICATIONS

International Search Report PCT/FI2008/050313 dated Sep. 17, 2008.
European Search Report, dated Jun. 13, 2012; Issued on corresponding Application No. EP 08 76 1709.
J. Crawley, and L. Maunder, "Dynamics of Dynamics of a Gyroscope Having Oblique Gimbal Axes", Journal of Mechanical Engineering Science, vol. 8, No. 3; Sep. 1, 1966 (pp. 294-299, XP008152754, DOI: 10.1243/JMES_JOUR_1966_008_038_02 p. 294, col. 1, lines 10-12.
JP Office Action dated Nov. 15, 2012; Issued on corresponding Application No. 2010-509856.

* cited by examiner

*Primary Examiner* — John Chapman, Jr.
(74) *Attorney, Agent, or Firm* — Squire Sanders (US) LLP

(57) ABSTRACT

The invention relates to measuring devices used in measuring angular velocity, and, more precisely, to vibrating micromechanical sensors of angular velocity. In the solution for a sensor of angular velocity, a mass is suspended using spring structures having non-orthogonal primary and secondary axes such, that an activation in phase with the primary motion is induced in a detection resonator. The angular velocity to be measured is detected from the phase difference between the primary motion and the secondary motion. The structure of the sensor of angular velocity enables reliable measuring with good performance, particularly, in small vibrating micromechanical solutions for a sensor of angular velocity.

12 Claims, 12 Drawing Sheets

METHOD FOR MEASURING ANGULAR VELOCITY AND A VIBRATING MICROMECHANICAL SENSOR OF ANGULAR VELOCITY

FIELD OF THE INVENTION

The invention relates to measuring devices to be used in measuring angular velocity and, more precisely, to vibrating micromechanical sensors of angular velocity. The object of the invention is to provide an improved sensor structure enabling reliable measuring with good performance, especially in small vibrating micromechanical solutions for a sensor of angular velocity.

BACKGROUND OF THE INVENTION

Measuring based on a vibrating sensor of angular velocity has proved to be a reliable method with a simple principle of operation for the measuring of angular velocity. In a vibrating sensor of angular velocity, a certain known primary motion is induced and maintained in the sensor. The desired movement to be measured by means of the sensor is then detected as a deviation of the primary motion.

An external angular velocity affecting the sensor in a direction perpendicular to the resonators' direction of motion will cause a Coriolis force in the seismic mass, in a direction perpendicular to its direction of motion. The Coriolis force, which is proportional to the angular velocity, is detected capacitively, for example, from the vibration of the mass.

Particularly in the consumer electronics market there is great demand for extremely low priced and small sensors of angular velocity. In such applications, the performance of the sensor, such as the zero point stability or the vibration sensitivity, is of marginal importance.

Present silicon micromechanical sensors of angular velocity on the market are much too bulky, complicated and expensive for such applications. Only small and cheap sensors of angular velocity of ceramics or quartz intended for optical picture stabilization in cameras come even close to the size objectives or the cost level needed in these applications.

However, using the technologies mentioned above, it is extremely difficult to achieve sufficient impact resistance to allow dropping the component on a hard surface without the component braking.

Below, prior art is described with exemplifying reference to the appended drawings, of which:

FIG. 1 shows a diagram of the functional structure of a vibrating micromechanical sensor of angular velocity according to prior art, and FIG. 2 shows a block diagram of the analog system electronics of a typical sensor of angular velocity according to prior art.

FIG. 1 shows a diagram of the functional structure of a vibrating micromechanical sensor of angular velocity according to prior art. The depicted vibrating micromechanical sensor of angular velocity according to prior art comprises a mass 1, supported at an activation frame 2 in the direction of the X-axis by means of springs 4, 5. Said activation frame 2 is further supported at a support structure 3 in the direction of the Y-axis by means of springs 6, 7.

In the illustrated vibrating micromechanical sensor of angular velocity according to prior art, the mass 1 in the middle, and the activation frame 2 surrounding it, are activated into a primary motion in the direction of the Y-axis, enabled by the springs 6, 7 supported at the body 3. The detection axis formed in the direction of the X-axis by means of the spring suspension 4, 5 of the mass 1 to the activation frame 2, is perpendicular to the primary motion.

When the structure vibrating in the primary motion is turned in relation to the Z-axis perpendicular to the surface xy-plane, the mass 1 in primary motion experiences a Coriolis force in the direction of the X-axis perpendicular to its direction of motion. Thus the detection springs 4, 5, in addition to defining the damping, further define the amplitude and phase of the vibration of the induced detection motion.

The measuring electronics of a modern sensor of angular velocity are rather complicated. In a typical implementation of the analog electronics, more than ten different blocks are needed even in the simplest case.

FIG. 2 shows a block diagram of the system electronics of a typical sensor of angular velocity according to prior art.

In present sensors of angular velocity, the detection of the Coriolis signal is implemented as a phase-sensitive amplitude detection by demodulating the signal of the detection resonator in phase with the Coriolis signal.

One sensor of angular velocity according to prior art is described in the patent publication U.S. Pat. No. 6,946,695. In said patent publication, the mass of the described sensor of angular velocity is spring suspended symmetrically to the substrate by means of a thin film. In the film serving as a spring, piezoelectric elements are formed out of piezoelectric thin film, by means of which the mass can be activated into a linear primary motion and by means of which this primary motion also can be detected. Additionally, at the film, by proper positioning, third piezoelectric elements are formed, the signal phase of which will change as a function of the angular velocity, which, due to the Coriolis force, displaces the primary motion in a direction perpendicular to the direction of the primary motion and to the direction of the external angular velocity.

The prior art patent publication clearly describes the principle, using phase shift, of measuring angular velocity by means of piezoelectric sensors. The described structure and method are based on the positioning of the piezoelectric elements such, that the third elements, which detect the angular velocity, detect the sum of both the primary motion and the secondary motion caused by the angular velocity, the phase of which is proportional to the angular velocity to be measured.

The structures according to prior art described above are not, however, suitable for use in sensors of angular velocity requiring good resistance to vibrations and impact.

Thus, the object of the invention is to provide a structure for a vibrating sensor of angular velocity, in which a large part of the measuring electronics of the vibrating sensor of angular velocity is implemented in a simpler manner compared to solutions according to prior art.

SUMMARY OF THE INVENTION

The object of the invention is to provide such an improved vibrating sensor of angular velocity, which enables reliable measuring with good performance particularly in small solutions for a vibrating sensor of angular velocity and in which a large part of the measuring electronics of the vibrating sensor of angular velocity is implemented in a simpler manner compared to earlier solutions according to prior art.

According to a first feature of the invention, a method is provided for measuring angular velocity by means of a vibrating micromechanical sensor of angular velocity, which sensor of angular velocity comprises at least one seismic mass and a moving electrode associated with that, which mass possesses a primary motion, which is to be activated, and, in addition to the primary motion, a second degree of freedom in relation to a detection axis nearly perpendicular to the primary motion, and which mass is supported at the frame of the sensor component by means of a spring structure such, that, in the method, said mass is suspended by means of a spring suspension having non-orthogonal primary and secondary axes in such a way, that an activation in phase with the primary motion is induced in the detection resonator, and the angular velocity to be measured is detected in a phase-sensitive manner, by means of a phase detector, from the phase difference between the primary motion and the secondary motion.

Preferably, one of the signals of the primary motion and the secondary motion is phase shifted by 90 degrees. Preferably, at least one of the signals of the primary motion and the secondary motion is amplified.

Preferably, the phase-sensitive detection is implemented by means of an XOR gate in such a way, that the signals of the primary and secondary motion are made into steep-edged pulse waves by means of a comparator, which waves are conveyed to the XOR circuit. Further, preferably, as the output of the phase-sensitive detection, a pulse-width modulated signal, proportional to the phase shift between the signals, is obtained. Further, preferably, out of the pulse-width modulated signal, which is proportional to the phase shift between the signals and is obtained as the output of the phase-sensitive detection, an analog output signal is made by low-pass filtering. Preferably, the primary motion is detected directly by means of a resistive coupling.

According to a second feature of the invention, an arrangement for measuring angular velocity by means of a vibrating micromechanical sensor of angular velocity is provided, which sensor of angular velocity comprises at least one seismic mass and a moving electrode associated with that, which mass possesses a primary motion, which is to be activated, and, in addition to the primary motion, a second degree of freedom in relation to a detection axis nearly perpendicular to the primary motion, and which mass is supported at the frame of the sensor component by means of a spring structure such, that the arrangement comprises a phase detector such, that, in the arrangement, said mass is suspended by a spring suspension having non-orthogonal primary and secondary axes in such a way, that an activation in phase with the primary motion is caused in the detection resonator, and that the angular velocity to be measured is detected by a phase detector in a phase-sensitive manner from the phase difference between the primary motion and the secondary motion.

Preferably, the arrangement further comprises a phase-shifter for shifting one of the signals of the primary motion and the secondary motion by 90 degrees. Preferably, the arrangement further comprises an amplifier for amplifying at least one of the signals of the primary motion and the secondary motion.

Preferably, the arrangement further comprises an XOR gate and a comparator, such that the phase-sensitive detection is implemented by means of the XOR gate such, that steep-edged pulse waves are made by means of the comparator out of the signals of the primary motion and the secondary motion, which waves are conveyed to the XOR gate. Further, preferably, the arrangement additionally comprises means for delivering, as output of the phase-sensitive detection, a pulse-width modulated signal proportional to the phase shift between the signals. Further, preferably, the arrangement additionally comprises means for low-pass filtering of the pulse-width modulated signal proportional to the phase shift between the signals, and for delivering an analog output signal as the output from the phase-sensitive detection. Preferably, the arrangement comprises means for detecting the primary motion directly by means of a resistive coupling.

According to a third feature of the invention, a vibrating micromechanical sensor of angular velocity is provided, which sensor comprises at least one seismic mass and a moving electrode associated with that, which mass possesses a primary motion, which is to be activated, and, in addition to the primary motion, a second degree of freedom in relation to a detection axis nearly perpendicular to the primary motion, and which mass is supported at the frame of the sensor component by means of a spring structure such, that said mass is suspended by means of a spring suspension having non-orthogonal primary and secondary axes in such a way, that an activation in phase with the primary motion is induced in the detection resonator, and where the angular velocity to be measured in the sensor of angular velocity is detected in a phase sensitive manner, by means of a phase detector, from the phase difference between the primary motion and the secondary motion.

Preferably, the sensor of angular velocity comprises means for phase-shifting one of the signals of the primary motion and the secondary motion by 90 degrees. Preferably, the sensor of angular velocity comprises means for amplifying at least one of the signals of the primary motion and the secondary motion.

Preferably, the sensor of angular velocity additionally comprises an XOR gate and a comparator, such that the phase-sensitive detection is implemented by means of the XOR gate in such a way, that the signals of the primary motion and the secondary motion are made into steep-edged pulse waves by means of the comparator, which waves are conveyed to the XOR gate. Further, preferably, the sensor of angular velocity additionally comprises means for delivering, as the output of the phase-sensitive detection, a pulse-width modulated signal proportional to the phase shift between the signals. Further, preferably, the sensor of angular velocity additionally comprises means for low-pass filtering of the pulse-width modulated signal, which is proportional to the phase shift between the signals, and for delivering, as the output of the phase-sensitive detection, an analog output signal. Preferably, the sensor of angular velocity comprises means for detecting the primary motion directly by means of a resistive coupling.

BRIEF DESCRIPTION OF THE DRAWINGS

Below, the invention and its preferable embodiments are described in detail with exemplifying reference to the attached drawings, of which:

FIGS. 1-2 were presented above. Below, the invention and its preferable embodiments will be described referring to the FIGS. 3-16.

DETAILED DESCRIPTION OF THE INVENTION

Figure 1:
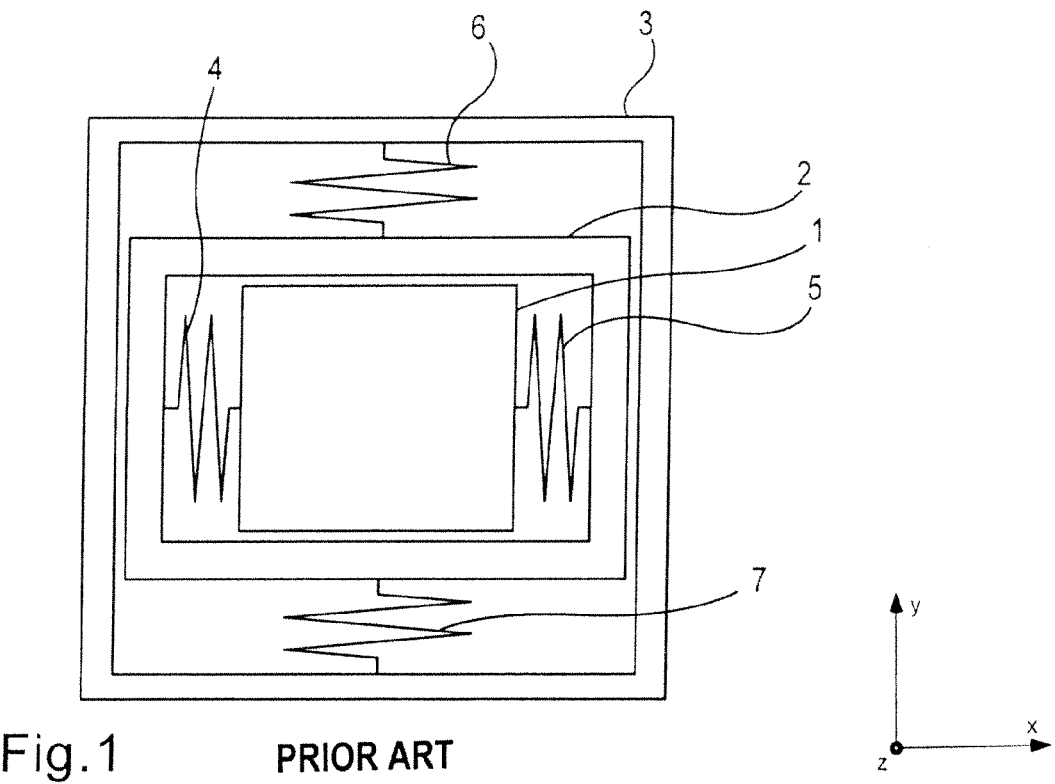
FIG. 1 shows a diagram of the functional structure of a vibrating micromechanical sensor of angular velocity according to prior art.
Figure 3:
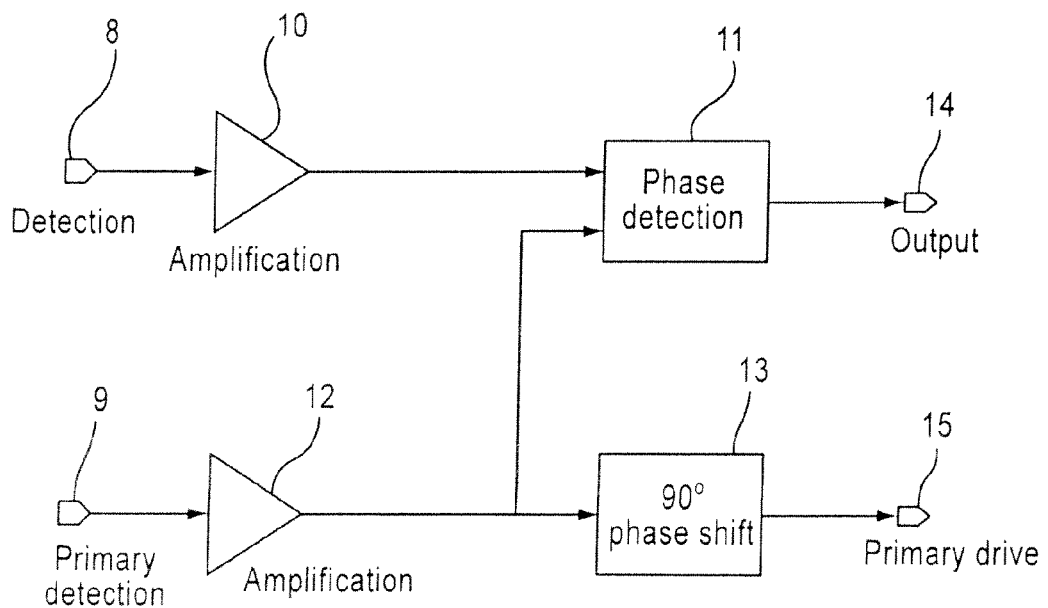
FIG. 3 shows a block diagram of measuring angular velocity according to the invention.
Figure 2:
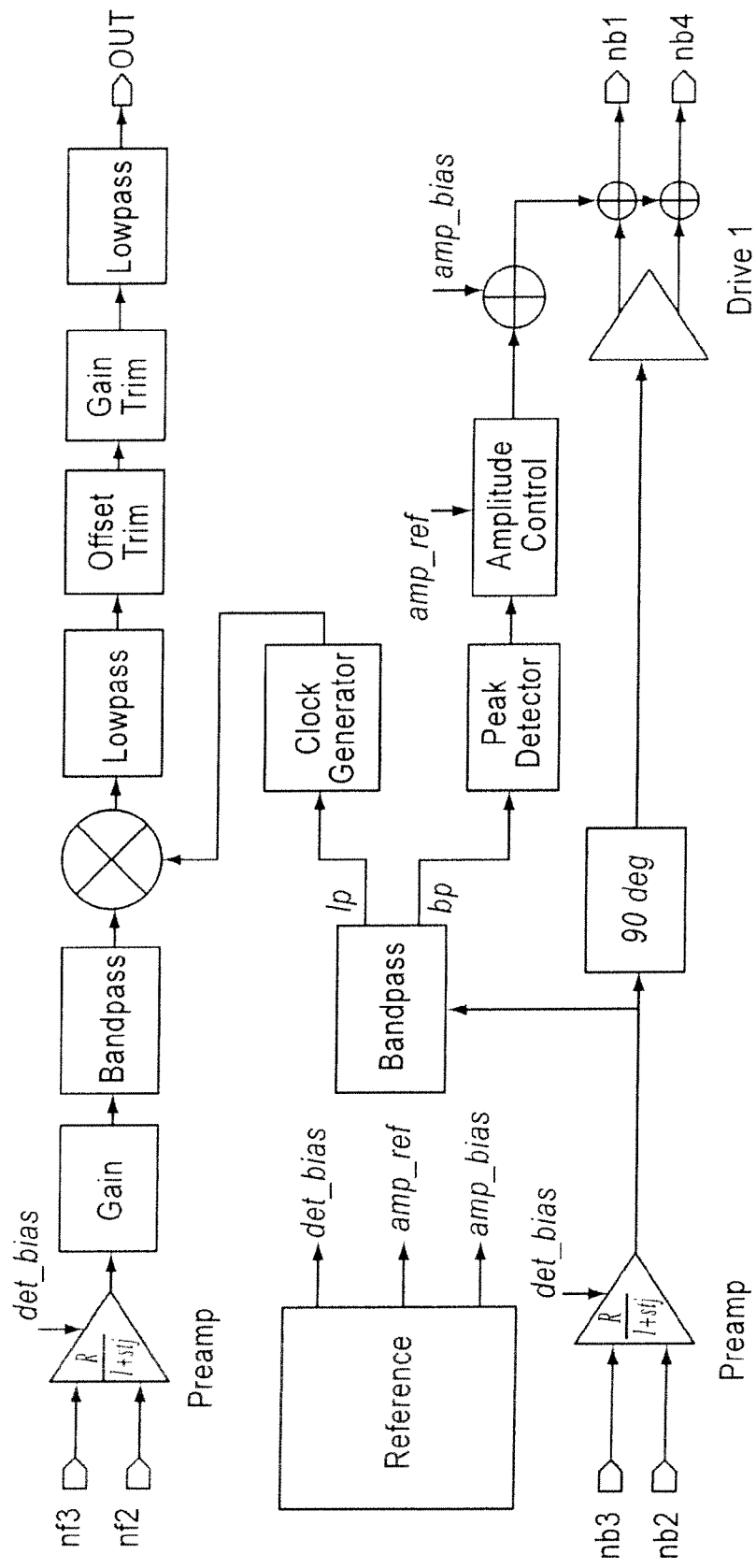
FIG. 2 shows a block diagram of the typical analog system electronics of a sensor of angular velocity according to prior art.

FIG. 3 shows a block diagram of the measuring of angular velocity according to the invention. The illustrated measuring of angular velocity according to the invention comprises a detection signal 8, which, via amplification 10, is conveyed to a phase detector 11. The measuring according to the invention further comprises a primary detection signal 9, which, via amplification 12, is conveyed to the phase detector 11 as well as to a 90 degree phase-shifting module 13. As the result of the measuring according to the invention, the output signal 14 from the phase detector 11 is obtained and also the phase-shifted primary drive signal 15 from the phase-shifting module 13.

Figure 4:
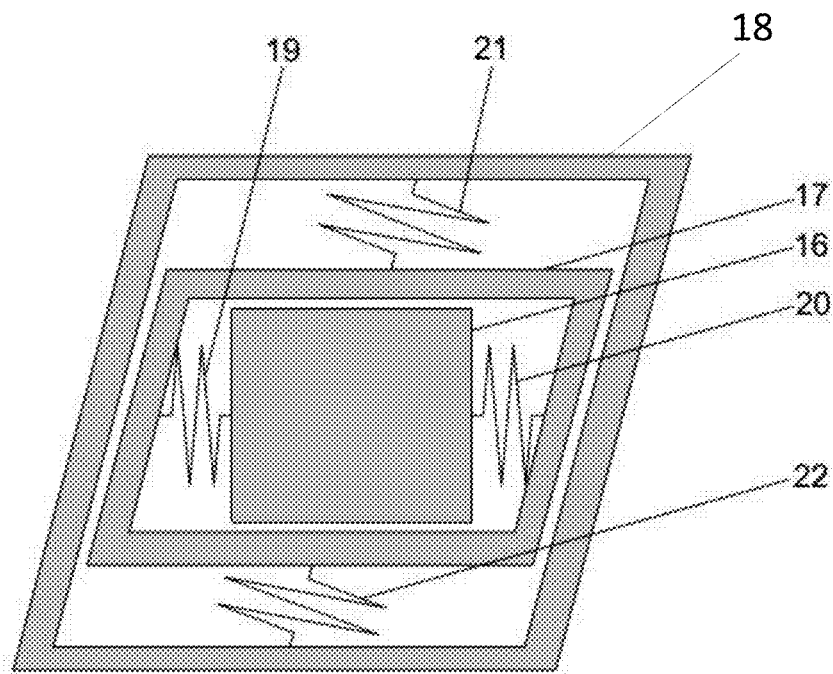
FIG. 4 shows a diagram of the functional structure of a vibrating micromechanical sensor of angular velocity according to the invention.

FIG. 4 shows a diagram of the functional structure of a vibrating micromechanical sensor of angular velocity according to the invention. In the measuring of angular velocity according to the invention, the mass in the center is activated into a primary motion in a direction deviating from the Y-axis. The detection axis formed by means of the support and spring suspension is suitably at an angle from the perpendicular in relation to the primary motion.

The illustrated vibrating micromechanical sensor of angular velocity according to the invention comprises a mass 16, supported by means of springs 19, 20 at an activation frame 17 skewed in the direction of the X-axis. Said activation frame 17 is further, in the direction of the Y-axis, supported in a skewed manner to a support structure 18 by means of springs 21, 22.

The mass 16 in the center of the illustrated vibrating micromechanical sensor of angular velocity according to the invention, and the activation frame 17 surrounding the mass are activated into a primary motion in a direction deviating from the Y-axis, by means of the springs 21, 22, which are supported at the body 18 in a skewed manner. The detection axis, in the direction of the X-axis, formed by means of the spring suspension 19, 20 of the mass 16 supported at the skewed activation frame 17, is suitably at an angle deviating from the perpendicular in relation to the primary motion.

When the structure vibrating in the primary motion is turned in relation to the Z-axis, perpendicular to the surface plane, the mass 16, moving in primary motion, experiences a Coriolis force in the direction of the X-axis perpendicular to the direction of its motion. Thus, the detection springs 19, 20 further, in addition to the damping, define the amplitude and phase of the generated detection motion.

Figure 5:
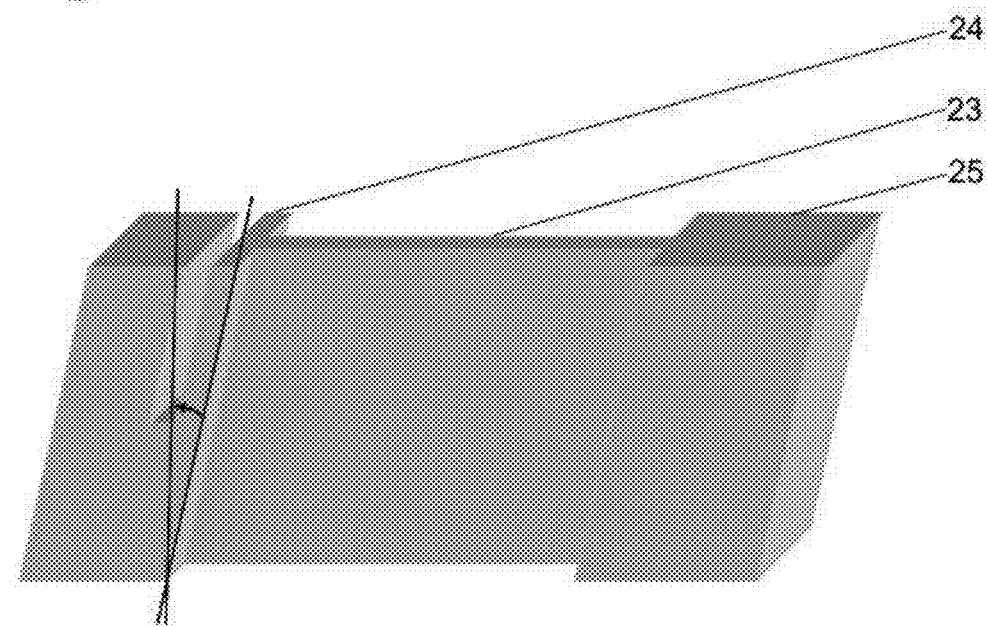
FIG. 5 shows a spring structure according to the invention.

FIG. 5 shows the spring structure according to the invention. In the spring structure according to the invention, the spring axis is turned for the structure of the sensor of angular velocity to be activated in the surface plane. The spring structure 23 according to the invention comprises attachment points 24, 25. One or more compensation grooves or compensation depressions are etched into at least one of the attachment points 24, 25 of the spring structure 23. The spring structure 23 according to the invention is asymmetrical such that the coupling, conveyed by the spring, from one mode of motion to another, cancels, or significantly reduces the coupling created by the non-ideality caused by the quadrature signal.

Figure 6:
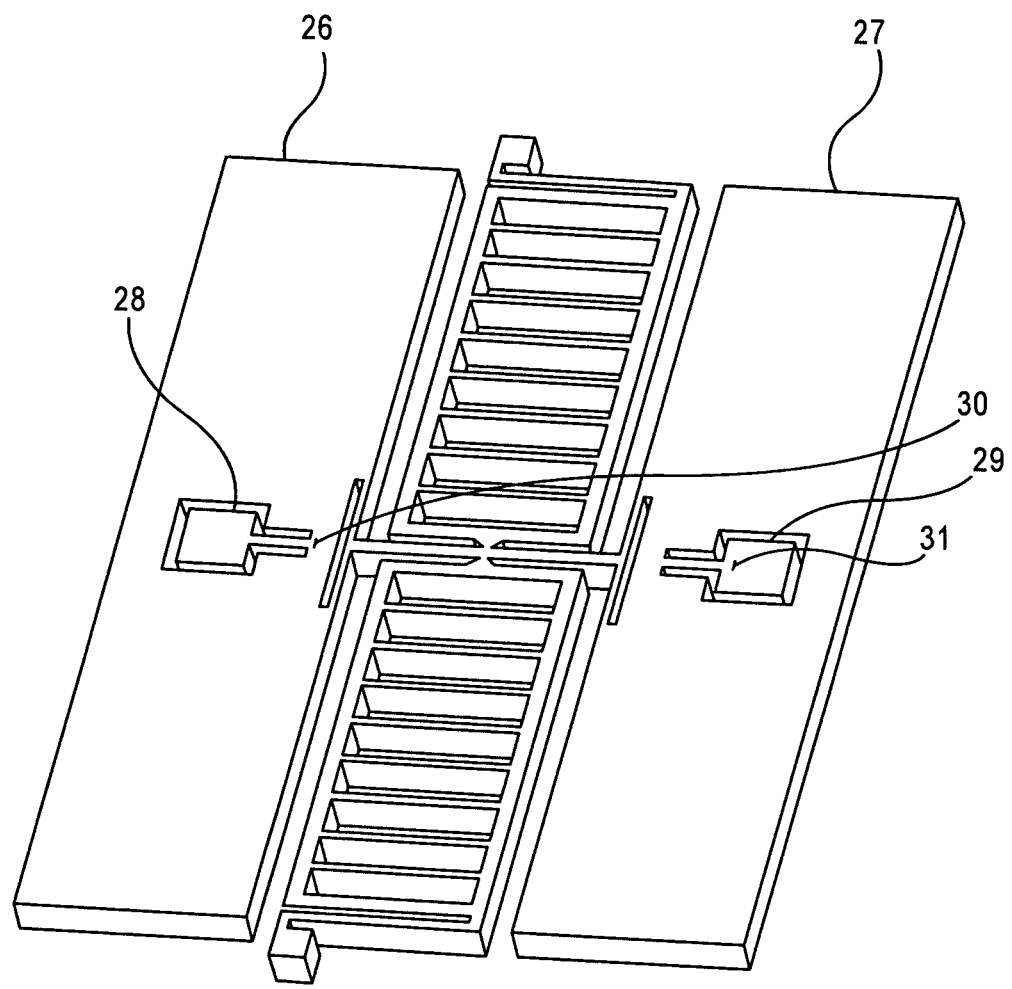
FIG. 6 shows the structure of a sensor of angular velocity according to the invention.

FIG. 6 shows the structure of a sensor of angular velocity according to the invention. In the spring structure according to the invention, the spring axis is turned for the structure of the sensor of angular velocity to be activated in the surface plane. The vibrating masses of the sensor of angular velocity according to the invention are indicated by the numbers 26 and 27. The masses 26 and 27 of the sensor of angular velocity are supported by means of the spring structures at their attachment points 28, 29. At the mass end 30 of the spring structure of the sensor of angular velocity, opposite to the attachment point 28, or, alternatively, at the attachment point 29 end 31 of the spring structure, one or more compensation grooves or compensation depressions 30, 31 are etched. The spring structure of the invention is asymmetrical, such that the coupling conveyed by the spring, from one mode of motion to another, cancels, or significantly reduces the coupling created by the non-ideality caused by the quadrature signal.

Figure 7:
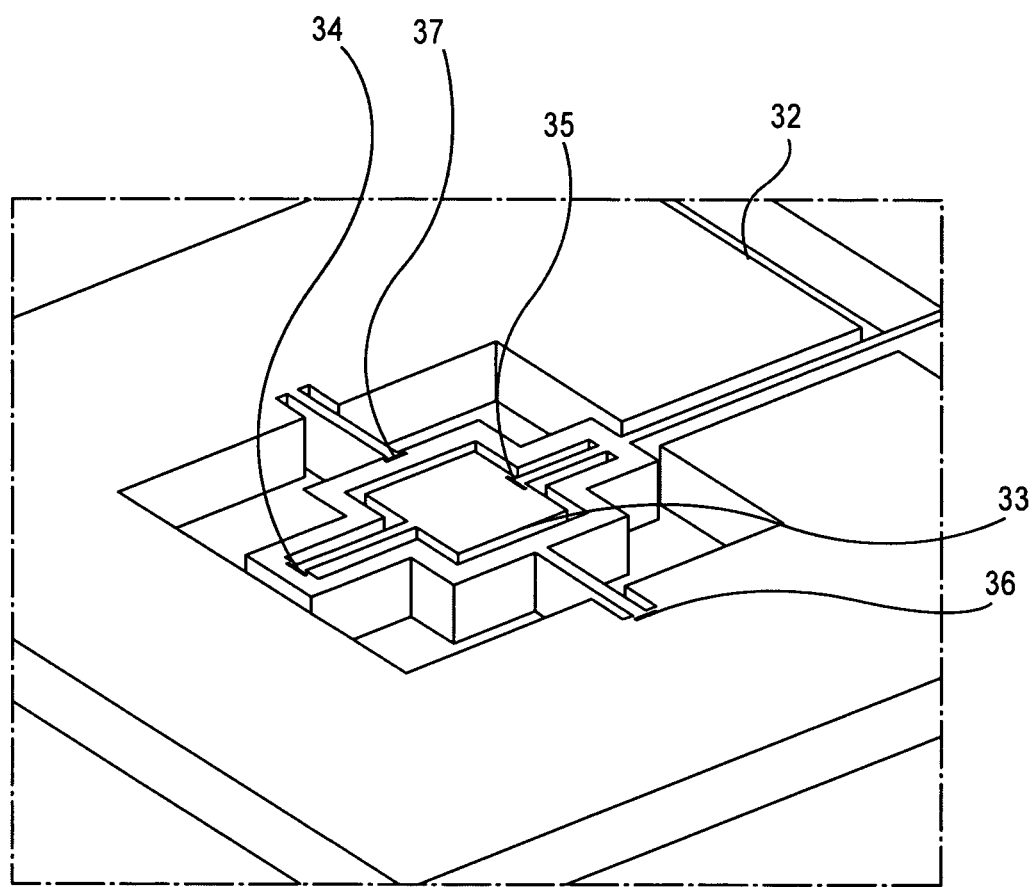
FIG. 7 shows the structure of a sensor of angular velocity with two axes according to the invention.

FIG. 7 shows the structure of a sensor of angular velocity with two axes, according to the invention. In the spring structure according to the invention, the spring axis is turned for the structure of the sensor of angular velocity with two axes to be activated in the surface plane. The vibrating mass of the sensor of angular velocity with two axes according to the invention is indicated by the number 32. The mass 32 of the sensor of angular velocity with two axes is supported by means of a spring structure at its attachment point 33. At the ends 34, 36 opposite to the attachment point 33 of the spring structure of the sensor of angular velocity with two axes or, alternatively, at the attachment point 33 ends 35, 37 of the spring structure, one or more compensation grooves or compensation depressions 34-37 are etched. The spring structure of the invention is asymmetrical, such that the coupling conveyed by the spring, from one mode of motion to another, cancels, or significantly reduces the coupling created by the non-ideality caused by the quadrature signal.

Figure 8:
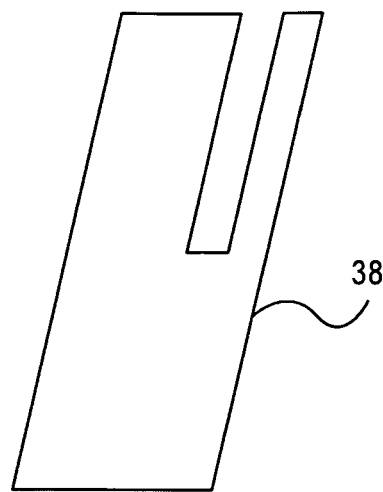
FIG. 8 shows a section through the spring structure used in supporting the seismic mass of a vibrating sensor of angular velocity according to the invention.

FIG. 8 shows a section through the spring structure used in supporting the seismic mass of a vibrating sensor of angular velocity according to the invention. The spring structure of the sensor of angular velocity according to the invention is indicated by the number 38. One or more compensation grooves are etched into the spring structure 38 according to the invention. The spring structure 38 according to the invention is asymmetrical, such that the coupling conveyed by the spring from one mode of motion to another cancels, or significantly reduces the coupling created by the non-ideality caused by the quadrature signal.

Figure 9:
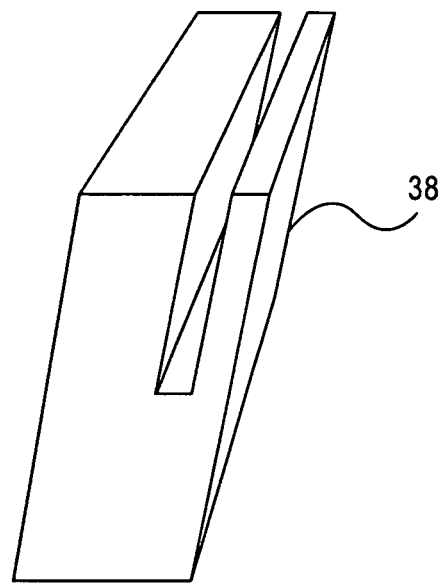
FIG. 9 shows a perspective view of the spring structure used in supporting the seismic mass of a vibrating sensor of angular velocity according to the invention.

FIG. 9 shows a perspective view of the spring structure used in supporting the seismic mass of a vibrating sensor of angular velocity according to the invention. The spring structure of the sensor of angular velocity according to the invention is indicated by the number 38. One or more compensation groove is etched into the spring structure 38 according to the invention.

In the production of the spring structures 38 according to the invention, shown in FIGS. 8-9, the etching mask can be designed such that it compensates for non-idealities over the wafer caused by the production process. Such non-idealities are, for example, a non-ideality caused by a deviation from the perpendicular to the wafer in the inclination of the groove of the DRIE (DRIE, Deep Reactive Ion Etching) etching process. Thus, the dimensioning of the compensation groove in the spring structure 38 according to the invention varies over the wafer.

The compensation groove in the spring structure 38 according to the invention can be etched in the same DRIE etching as the other structures. In the production of the spring structure 38 according to the invention, because of the ARDE phenomenon (Aspect Ratio Dependent Etch rate) the compensation groove will not etch its way through the wafer; rather, the groove can be dimensioned to have a suitable depth. Alternatively, a groove of a suitable depth can be etched by, for example, a two-stage etching process.

Figure 10:
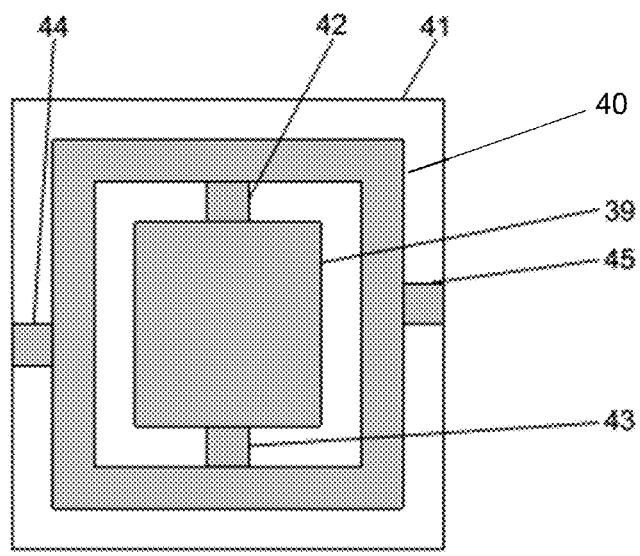
FIG. 10 shows an alternative structure of a sensor of angular velocity according to the invention.

FIG. 10 shows an alternative structure of a sensor of angular velocity according to the invention. In the alternative structure of the sensor of angular velocity according to the invention, the spring axes are intentionally designed to be slightly non-orthogonal. In the measuring of angular velocity according to the invention, the mass in the center is activated into a primary motion in a direction deviating from the X-axis. The detection axis formed by the support and spring suspension is suitably deviating from the perpendicular in relation to the primary motion.

The illustrated alternative vibrating micromechanical sensor of angular velocity according to the invention comprises a mass 39, which, in the direction of the Y-axis, is supported to an activation frame 40 by means of springs 42, 43. Said activation frame 40 is further supported, excentrically in the direction of the X-axis, to a support structure 41 by means of springs 44, 45.

In the illustrated alternative vibrating micromechanical sensor of angular velocity according to the invention, the mass 39 in the center, and the activation frame 40 surrounding it, are activated into a primary motion deviating from the direction of the X-axis by means of the springs 44, 45 supported excentrically at the body 41. The detection axis, formed in the direction of the Y-axis by means of the spring suspension 42, 43 of the mass 39 supported at the activation frame 40, is suitably at an angle deviating from the perpendicular in relation to the primary motion.

As the structure vibrating in its primary motion is turned in relation to the Z-axis perpendicular to the surface plane, the mass 39, moving in primary motion, experiences a Coriolis force in the direction of the Y-axis perpendicular to its direction of motion. Further, the detection springs 42, 43, then, in addition to the damping, define the amplitude and phase of the generated detection motion vibration.

By means of the method according to the invention, a phase-sensitive detection of the angular velocity can be implemented utilizing the quadrature signal. The Coriolis force changes the phase of the vibration of the detection resonator, since the size of the quadrature signal stays unchanged and the phase of resultant of the signals changes almost linearly in relation to the amplitude of the Coriolis signal according to formulae (1)-(2).

$$S_{sec} = Q\sin(\omega_0 t) + C\cos(\omega_0 t) \quad (1)$$
$$= \sqrt{Q^2 + C^2} \sin\left(\omega_0 t + \arctan\left(\frac{C}{Q}\right)\right),$$

where $C = \Omega \cdot Amp \cdot k_1$, and $Q = \sin \phi \cdot Amp \cdot k_2$.

$$S_{prim} = |S_{prim}| \cdot \sin(\omega_0 t) \quad (2)$$

In the method according to the invention, the angular velocity can be detected from just the phase difference between the activation motion and the detection motion. The phase difference can be detected neatly using the logical function XOR on the "steep-edged pulse waves" formed from the signals. At the output of the XOR gate, a PWM (Pulse Width Modulation) signal appears, proportional to the phase difference between the signals. The sign of the phase shift, and thus that of the angular velocity, is obtained, when one of the signals is phase-shifted by 90°.

Figure 11:
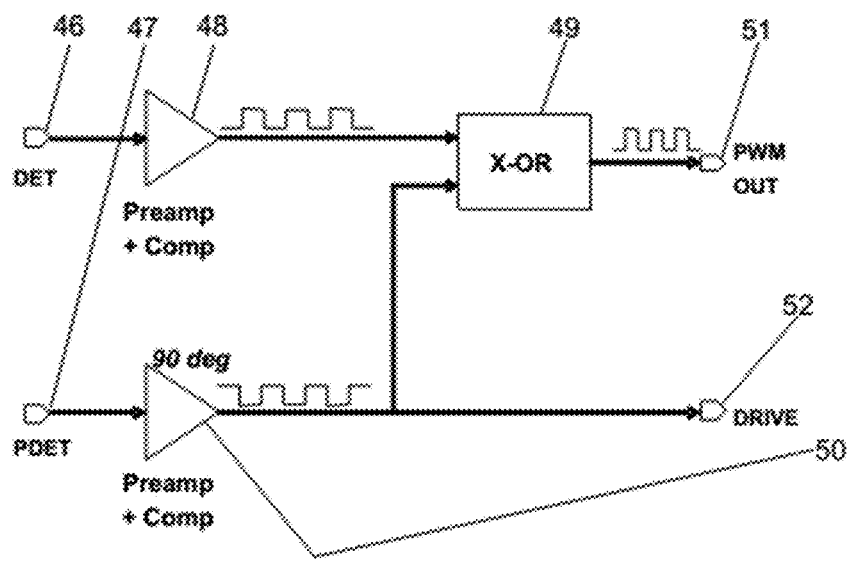
FIG. 11 shows a block diagram of the measuring system of a sensor of angular velocity according to the invention.

FIG. 11 shows a block diagram of a measuring system of a sensor of angular velocity, according to the invention. In the measuring system of the sensor of angular velocity, according to the invention, following detection of the primary motion, steep-edged pulse waves are made out of the signals 46, 47 by means of a comparator 48, 50, which signals are conveyed to the XOR gate 49. At the circuit's output 51, 52, both the phase-shifted primary driving signal 52 and the PWM-modulated information 51 related to the angular velocity are seen, which can be read directly by means of, for instance, a microcontroller. In the measuring system of the sensor of angular velocity, according to the invention, it is also easy to make the PWM-signal 51 analog by low-pass filtering.

In the measuring system of the sensor of angular velocity, according to the invention, no actual amplitude regulator is needed in activating the primary motion. Furthermore, the easiest way to detect the primary motion is by a direct resistive coupling, whereby no separate 90' phase shifter is needed for the activation, nor for the modulation.

Figure 12:
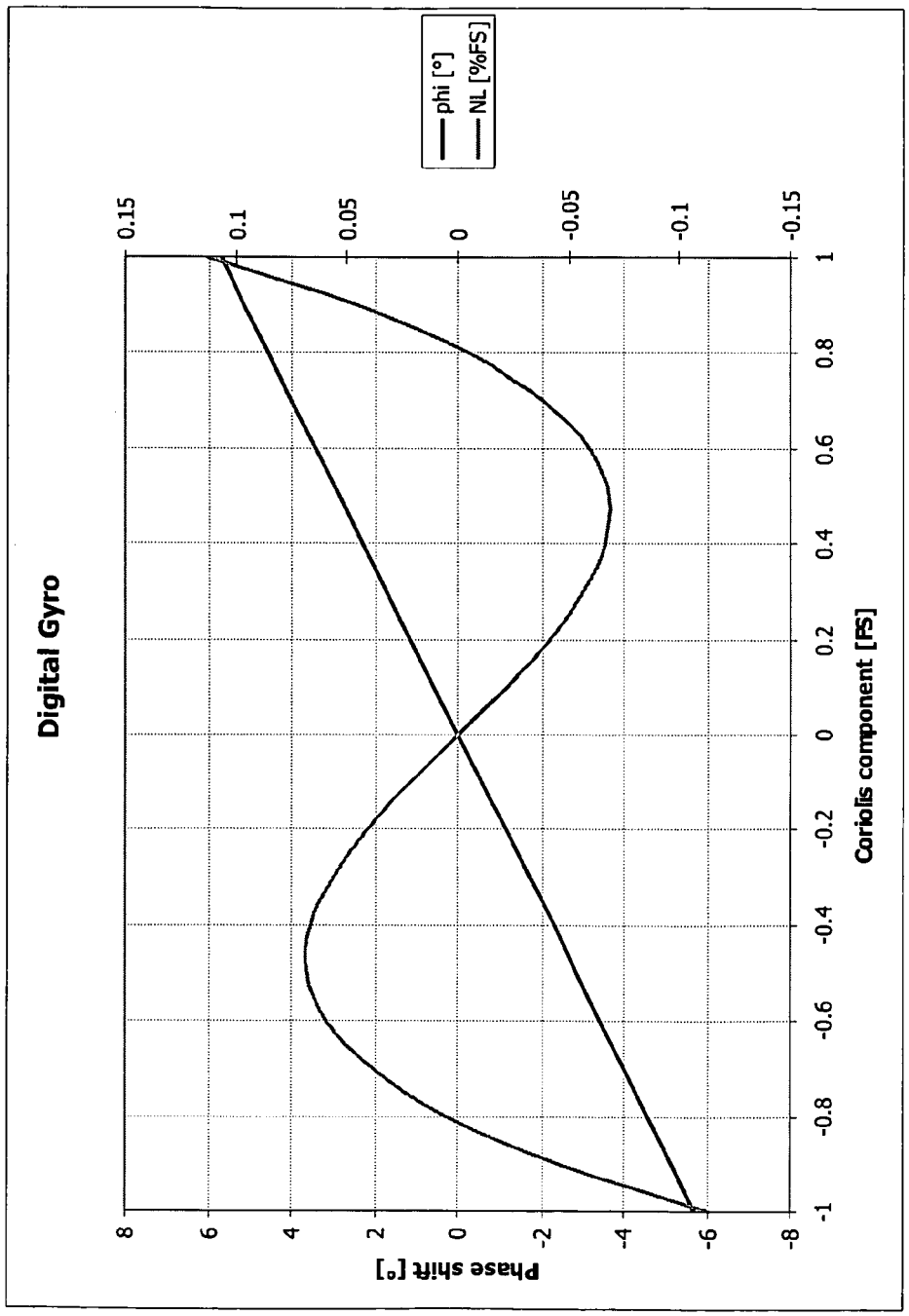
FIG. 12 shows a diagram of the phase shift's dependence on the angular velocity.

FIG. 12 shows a diagram of the phase-shift's dependence on the angular velocity. In the diagram, there is 10 FS of quadrature signal, and the function is extremely linear. Particularly, already at 2 FS of quadrature signal, the non-linearity is <3%. A disadvantage of a larger quadrature signal is, naturally, a decrease in sensitivity and also in the signal-to-noise ratio. A suitable quadrature signal size, for the system according to the invention, would probably be about 2 . . . 10 FS.

Figure 13:
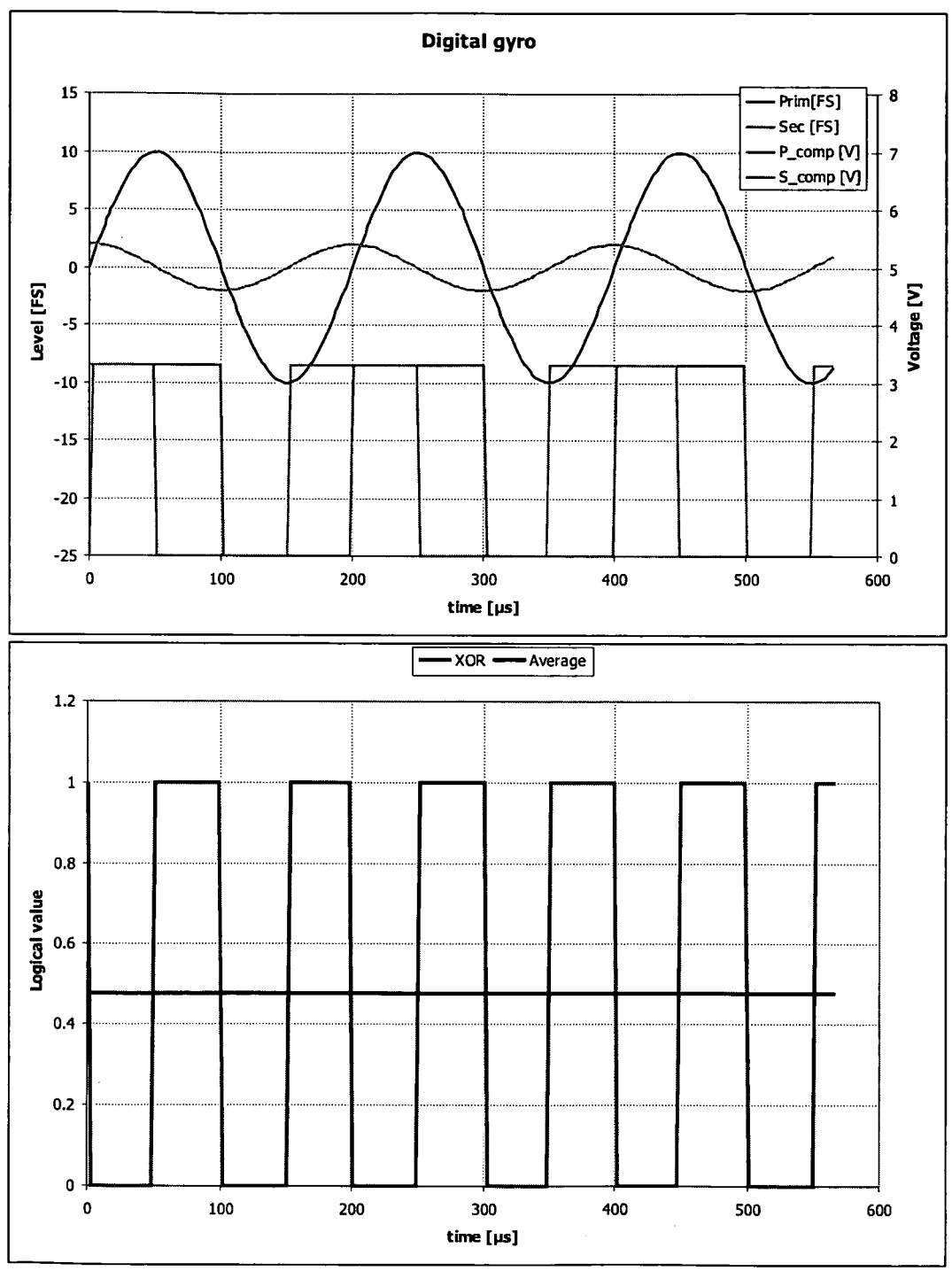
FIG. 13 shows a signal diagram of the measuring system of a sensor of angular velocity according to the invention.

FIG. 13 shows a signal diagram from a measuring system of a sensor of angular velocity, according to the invention. In the depicted signal diagram, the size of the quadrature signal is 2 FS and there is no angular velocity.

Figure 14:
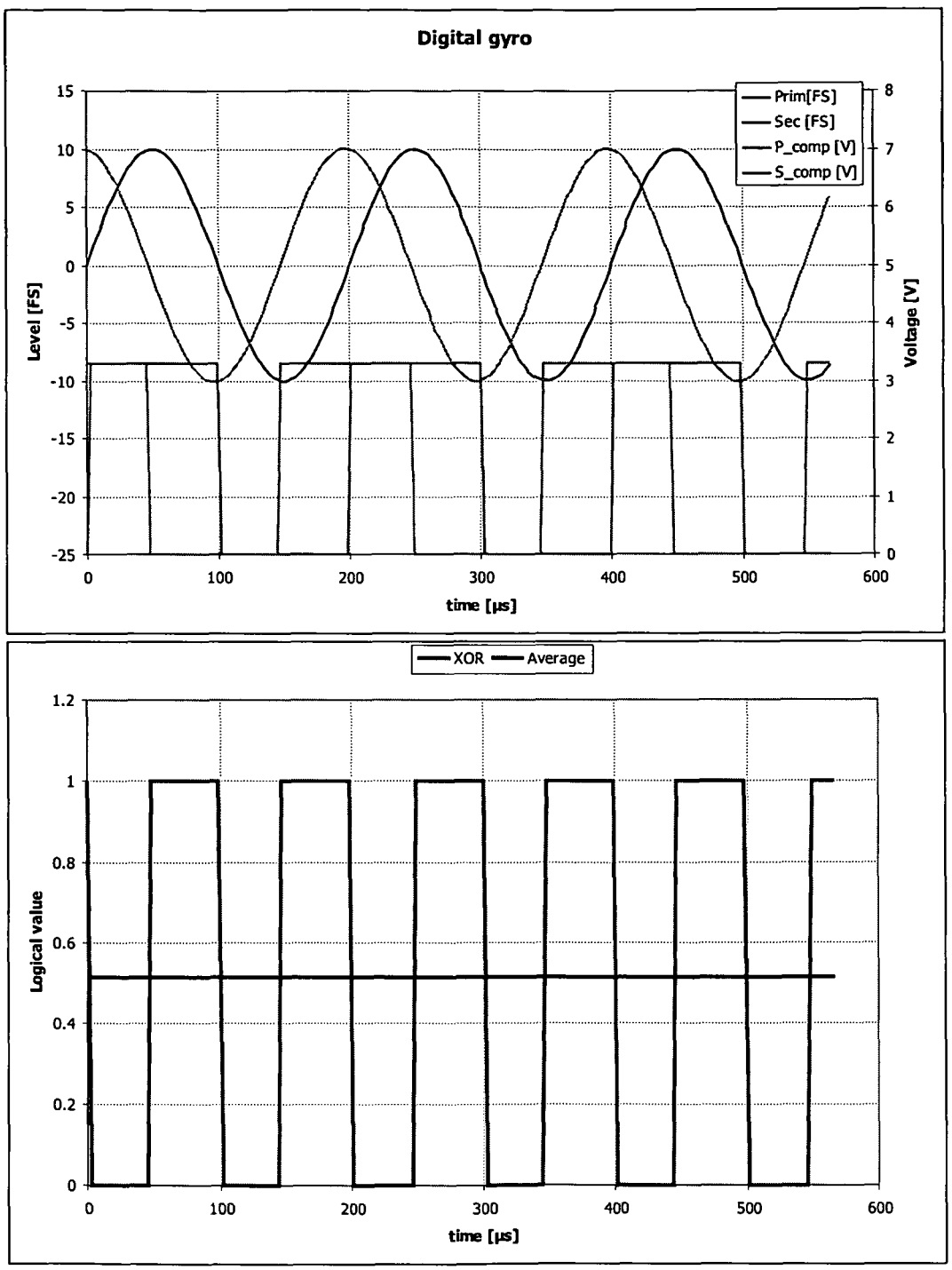
FIG. 14 shows a signal diagram of an alternative measuring system of the sensor of angular velocity according to the invention.

FIG. 14 shows a signal diagram from an alternative measuring system of a sensor of angular velocity, according to the invention. In the depicted signal diagram, the size of the quadrature signal is 10 FS and the angular velocity is 1 FS.

Figure 15:
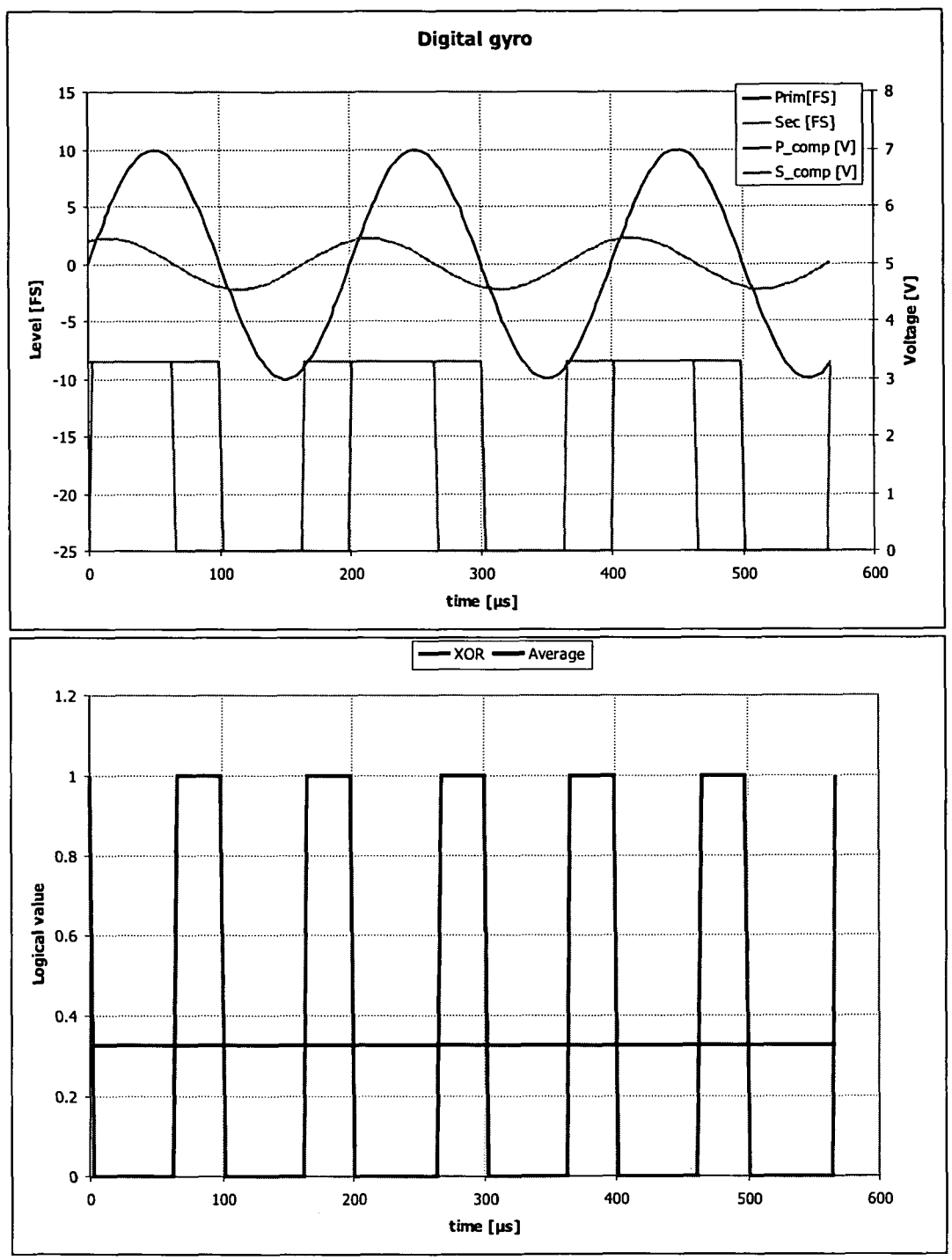
FIG. 15 shows a signal diagram of a second alternative measuring system of the sensor of angular velocity according to the invention.

FIG. 15 shows a signal diagram from a second alternative measuring system of a sensor of angular velocity, according to the invention. In the depicted signal diagram, the size of the quadrature signal is 2 FS and the angular velocity is −1 FS.

Figure 16:
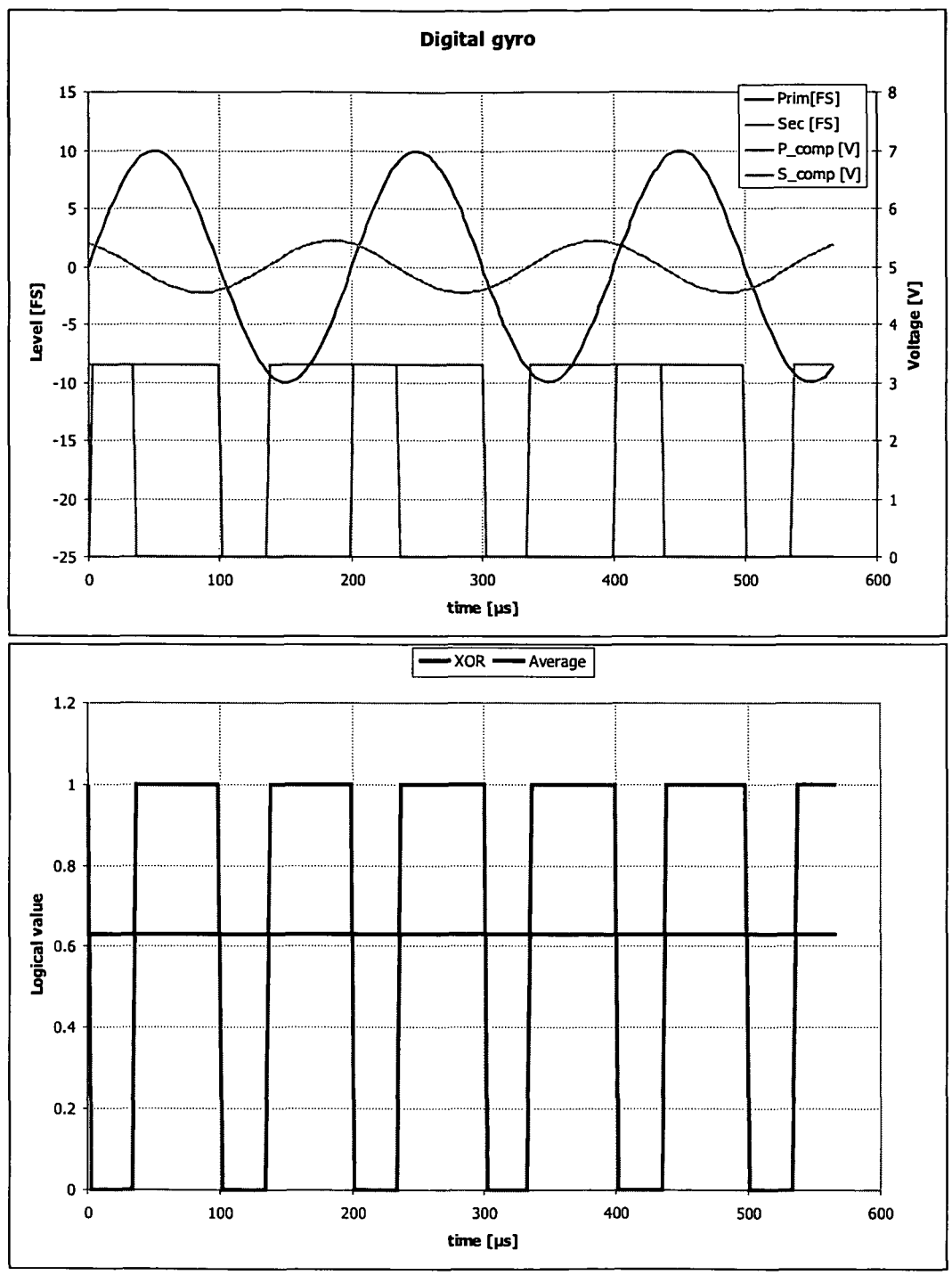
FIG. 16 shows a signal diagram of a third alternative measuring system of the sensor of angular velocity according to the invention.

FIG. 16 shows a signal diagram from a third alternative measuring system of a sensor of angular velocity, according to the invention. In the depicted signal diagram, the size of the quadrature signal is 2 FS and the angular velocity is 1 FS.

In the FIGS. 13-16, the upper diagram shows the activation motion (Prim) and the detection motion (Sec) as a function of time, of which compared digital signals are shown on the scale to the right. On the other hand, the lower part of the FIGS. 13-16 show the output of the XOR gate and the average over time, calculated from that.

In the solution according to the invention, sensitivity control in the system according to the invention is hard to implement in other ways than by compensating for the quadrature signal, which can be done, if necessary, either by means of a static voltage or by mixing the signals. In practice, in the simplest implementation, the sensor can be calibrated by means of a program in an MCU.

The activation of the primary motion can also turn out to be a problem, if there is too much off-set in the input to the comparator. Then, a initial kick of some kind can be used, such that the comparator can be made to switch states. At best, the initial transient caused by turning on the power could be sufficient as a kick.

By means of the invention, a sensor of angular velocity could be implemented with a tailor-made SMD sensor element, about ten passive components, one dual comparator and one XOR logic gate. The solution according to the invention is an absolutely superior concept compared to competing solutions, in most of which, even in the cheapest ones, several passive components are needed in addition to the packaged component level product.

By means of the invention, also front-ends, comparators and the XOR can be integrated in association with a microcontroller used by the customer, whereby the cost and space requirements caused by the measuring of angular velocity would be minimized.

There are commercial microcontrollers on the market, having integrated comparator inputs, the outputs of which are accessible at the outside of the circuit. Thus, the sensor of angular velocity according to the invention can be implemented using just passive components, since the XOR function naturally also can be implemented by software.

In the solution for a sensor of angular velocity according to the invention, the sensor electronics have been reduced to be simple and cheap enough. In addition, the sealing method for hermetically enclosing the wafer plane enables the sensor elements to be soldered directly onto a circuit board of the customer, whereby, in some applications, one can produce just the sensor element to be soldered.

By means of the invention, a large part of the measuring electronics of a vibrating sensor of angular velocity can be implemented in an extremely simple way. Further, the output of the system can be read directly in digital or analog form.

The invention can, at its most general level, be seen as creating a primary motion axis, slightly non-orthogonal in relation to the detection axis, by designing the spring suspension such, that the primary motion causes an activating force to the detection axis in phase with the motion.

In typical sensor solutions, a particularly suitable deviation from the orthogonal would be about 0.01° . . . 0.5°. In sensors of angular velocity moving in the surface plane, measuring relative to an axis perpendicular to the surface plane, such a deviation can be designed by, for example, directly designing the masks forming the springs.

A particular advantage of the solution according to the invention is the fact, that the resonance phenomenon of the secondary resonator affects the activation created by means of the spring suspension in exactly the same way as the Coriolis activation shifting the phase of the summed signal. Thus, the sensor's sensitivity to mechanical disturbances, or to electric noise occurring before the phase comparison, decreases substantially compared to prior art sensors of angular velocity.

There are further advantages in the solution according to the invention. The invention is insensitive to the amplitude of the activation motion. The sensitivity of the sensor depends solely on the ratio of quadrature signal to Coriolis signal, which remains constant regardless of the amplitude. However, the amplitude of the activation motion naturally influences the noise level of the sensor, and thus the output will be extremely noisy for a short while, as the device is being switched on.

A better quadrature signal tolerance than in an ordinary sensor system of angular velocity could also be considered an advantage of the invention. The functioning, as such, is based on the quadrature signal, and thus, a moderate quadrature signal does not cause even creeping of the null point, except through a decrease in sensitivity. The quadrature signal can, however, be quite large, in the sensitivity sense. Also, a large spread requires a wide sensitivity control range.

The invention is suitable for all kinds of measuring principles in a sensor of angular velocity, such as piezo-electric, piezo-resistive and capacitive ones.

We claim:

1. A method to measure angular velocity using a vibrating micromechanical sensor of angular velocity, wherein the sensor of angular velocity comprises a seismic mass, a moving electrode associated with the seismic mass, and a spring structure suspension, the method comprising:
    supporting the seismic mass to a body of the sensor by a spring structure suspension having non-orthogonal primary and secondary axes such that primary motion of the seismic mass in the direction of the primary axis induces an activating force in a nearly perpendicular direction of the secondary axis;
    activating the seismic mass into the primary motion in the direction of the primary axis:
    detecting a secondary motion as movement of the seismic mass in the direction of the secondary axis; and
    phase-sensitively detecting the angular velocity of the body of the sensor from a phase difference between the primary motion and the secondary motion.

2. The method according to claim 1, further comprising:
    phase-shifting by 90 degrees one of the primary motion and secondary motion signals.

3. The method according to claim 1, further comprising:
    amplifying at least one of the primary motion and secondary motion signals.

4. The method according to claim 1, further comprising:
    implementing the phase-sensitive detection using an XOR gate such that steep-edged pulse waves are made out of the primary motion and secondary motion signals by a comparator, which waves are conveyed to the XOR gate.

5. The method according to claim 4, further comprising:
    obtaining, as output of the phase-sensitive detection, a pulse-width modulated signal proportional to the phase shift between the signals.

6. The method according to claim 5, further comprising:
    obtaining as output of the phase-sensitive detection an analog output signal made by low-pass filtering out of the pulse width modulated signal proportional to the phase shift between the signals.

7. A system to measure angular velocity comprising:
    a vibrating micromechanical sensor of angular velocity, wherein the sensor of angular velocity comprises a body, a phase detector, a seismic mass, a moving electrode associated with the seismic mass, and a spring structure suspension wherein the seismic mass is supported to the body of the sensor suspended by the spring structure suspension;

the spring structure suspension has non-orthogonal primary and secondary axes such that primary motion of the seismic mass in the direction of the primary axis induces an activating force in a nearly perpendicular direction of the secondary axis;

the phase detector is configured to detect a secondary motion as movement of the seismic mass in the direction of the secondary axis; and the phase detector is configured to phase-sensitively detect angular velocity of the body of the sensor from a phase difference between the primary motion and the secondary motion.

8. The system according to claim 7, further comprising:

a phase-shifter configured to shift the phase of one of the primary motion or secondary motion signals by 90 degrees.

9. The system according to claim 7, further comprising:

an amplifier configured to amplify at least one of the primary motion or secondary motion signals.

10. The system according to claim 7, further comprising:

an XOR gate and a comparator, wherein the phase-sensitive detection is implemented by the XOR gate , and using the comparator such that the primary motion and secondary motion signals are made into steep-edged pulse waves, which are conveyed to the XOR gate.

11. The system according to claim 10, further comprising:

a transmitter configure to transmit, as output of the phase-sensitive detection, a pulse width modulated signal proportional to the phase-shift between the signals.

12. The system according to claim 11, further comprising:

a low-pass filter configured to low-pass filter the pulse-width modulated signal proportional to the phase-shift between the signals, and to deliver an analog output signal as output of the phase-sensitive detection.

* * * * *